United States Patent [19]

Hogan

[11] 4,361,446
[45] Nov. 30, 1982

[54] SPHERE LAUNCHING METHOD

[75] Inventor: Alfred D. Hogan, Tulsa, Okla.

[73] Assignee: Geosource, Inc., Houston, Tex.

[21] Appl. No.: 198,453

[22] Filed: Oct. 20, 1980

Related U.S. Application Data

[62] Division of Ser. No. 23,233, Mar. 23, 1979, Pat. No. 4,268,932.

[51] Int. Cl.$^3$ .............................................. B08B 9/02
[52] U.S. Cl. ...................................................... 134/8
[58] Field of Search ............... 15/104.06 R, 104.06 A; 137/268; 134/8

[56] References Cited

U.S. PATENT DOCUMENTS 3,169,263 2/1965 Eagleton ...................... 15/104.06 A
3,543,789 12/1970 Wheatley ................. 15/104.06 A X Primary Examiner—Marc L. Caroff
Attorney, Agent, or Firm—Cox & Smith Incorporated

[57] ABSTRACT

Spheres are sequentially released into a pipeline from a sphere storage barrel in response to the opening and closing of a valve closure member by means of a sphere launching apparatus. The apparatus has a releasing means, pivotable about a first axis, for engaging the valve closure member and a catcher, pivotable about a second axis, for releasably engaging the spheres as well as an actuating link connecting the releasing means with the catcher.

In response to the opening and closing of the valve closure member, the catcher is angularly pivoted into and out of engagement with successive spheres at a first rate, upon angular pivoting of the releasing means at a second rate less than the first rate, to sequentially release spheres and to allow the valve closure member to substantially close before releasing the next sphere.

1 Claim, 8 Drawing Figures

SPHERE LAUNCHING METHOD

This is a division of application Ser. No. 023,233, filed Mar. 23, 1979, now U.S. Pat. No. 4,268,932.

BACKGROUND OF THE INVENTION

This invention relates generally to a sphere launching apparatus for launching a sphere in a fluid carrying pipeline. In particular, the invention relates to an apparatus for a sequentially ejecting spheres by gravity into a pipeline upon the opening and closing of a check valve.

Numerous apparatus have been proposed in the past which provide a means for ejecting plugs or spheres (commonly referred to as "pigs") into pipelines. Examples of such apparatus are exemplified in U.S. Pat. Nos.: 2,818,592; 2,965,125; 3,000,028; 3,028,996; 3,146,477; 3,166,094; 3,266,077; 3,322,140; 3,397,570; 3,408,674; and, 3,543,769.

In particular, U.S. Pat. No. 3,169,263 issued to H. N. Eagleton which is assigned to the same entity as this application, discloses a sphere launching apparatus which is operated upon the opening and closing of a check valve. This device discloses in FIG. 4 a releasing means 96 which is pivotally mounted about a pivot pin 94 and includes a roller 98 for engaging a clapper valve for operating the releasing means. A catcher means 100 is also pivotally mounted about the shaft 94 and as best shown in FIG. 3 of the Eagleton patent includes clutch shoulders 104 and 105 which alternately engage similar clutch shoulders 107 on the releasing means 96. The clutch shoulders provide a lost motion connector between the releasing means and catcher means so that the releasing means can be rotated independently of the catching means after the catching means has rotated a predetermined amount. As best shown in FIG. 4 of said patent, when the portion 109 has engaged the top of the valve, the catching means 100 can no longer rotate counterclockwise while the releasing means 96 can further rotate counterclockwise to allow the sphere 102(a) to be released.

In the case of very large pipelines which may be in the order of three feet in diameter, the spheres may become very heavy. It is best shown in FIG. 1 of the Eagleton patent, a plurality of spheres are provided for sequentially releasing upon actuation of the catcher means and releasing means. Accordingly, should the launcher tube 10 be of such a size to allow for very large spheres, the weight of these spheres would react through gravity on the catcher arm 100. After a sphere 102(a) is released, the clapper of the valve is closed which allows the releasing means 96 to rotate until the shoulder 107 engages the shoulder 105. At this point the releasing means will cause the catcher means to rotate clockwise as shown in FIG. 4 to allow the next sphere 102(b) to roll into engagement with the releasing means 96. If this sphere engages the releasing means before the clapper is closed, it will be necessary to exert sufficient force on the clapper which in turn exerts the force on the releasing means to force the sphere 102(b) and any additional spheres back up into the launching tube 10 to seal off the launching tube. When the launching tube is full of very large spheres, this may require a very large amount of force to close the clapper valve.

Also the shoulders 104, 105 and 107 of Eagleton control the angular relationship between the releasing means and catcher means. Accordingly, some care must be exercised in manufacturing regarding tolerances between the parts.

It is an object of this invention to provide a linkage mechanism which will not be actuated to release a sphere until the clapper is almost closed so that the clapper will be able to close or substantially close before the releasing means is engaged by the next sphere. It is also an object of this invention to provide a mechanism which can be manufactured simply and economically without the need for very close tolerances. It is also an object of the invention to provide an apparatus which can be adjusted and thus eliminate the need for very close tolerances. Other objects of the invention will be apparent from the following description.

SUMMARY OF THE INVENTION

A new and improved sphere launching apparatus having a releasing means which engages a valve closure member which may be a clapper valve. A catcher means is provided for sequentially releasing a sphere into a pipeline upon actuation of the releasing means by moving of the valve closure member. The releasing means is rotatably mounted about a first axis and the catcher means is rotatably mounted about a second axis which is spaced from the first axis. An adjustable link interconnects the releasing means and catcher means so that the relative angular relationship between the releasing means and catching means may be adjusted. A lost motion connector is provided for the link and the releasing means so that the releasing means can release the sphere into a pipeline while the catcher means prevents any other spheres from being released. The releasing means does not actuate the catcher means until the releasing means has almost rotated to the valve closed position and the linkage means provides an angular movement of the catcher means greater than the angular movement of the releasing means so that the valve member may reach or almost reach the fully closed position before the next sphere rolls into position in engagement with the releasing means for release into the pipeline.

BRIEF DESCRIPTION OF THE PREFERRED EMBODIMENT

Figure 1:
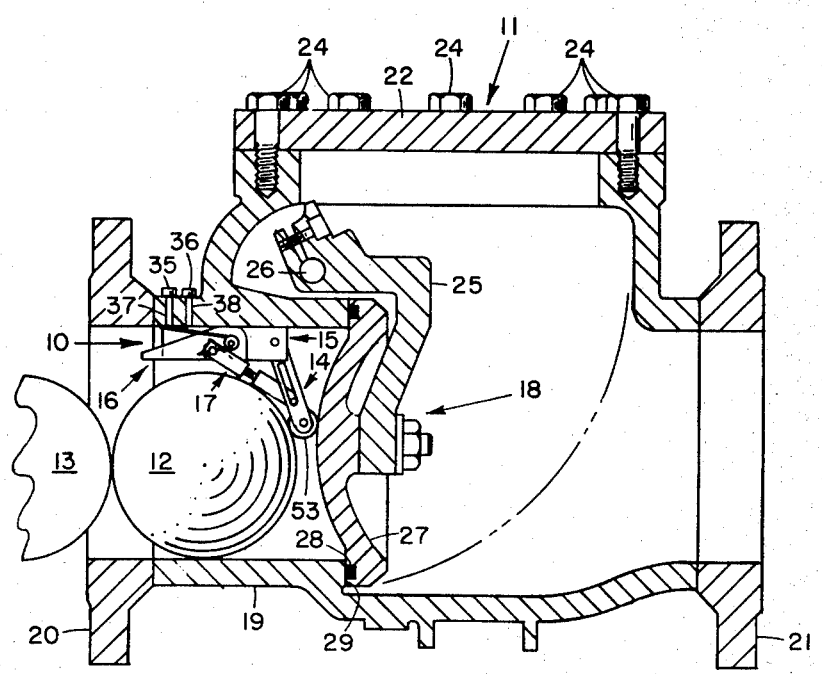
FIG. 1 is a side elevation view of the sphere launching apparatus, partly in cross-section, prior to release of a sphere in a pipeline.
Figure 4:
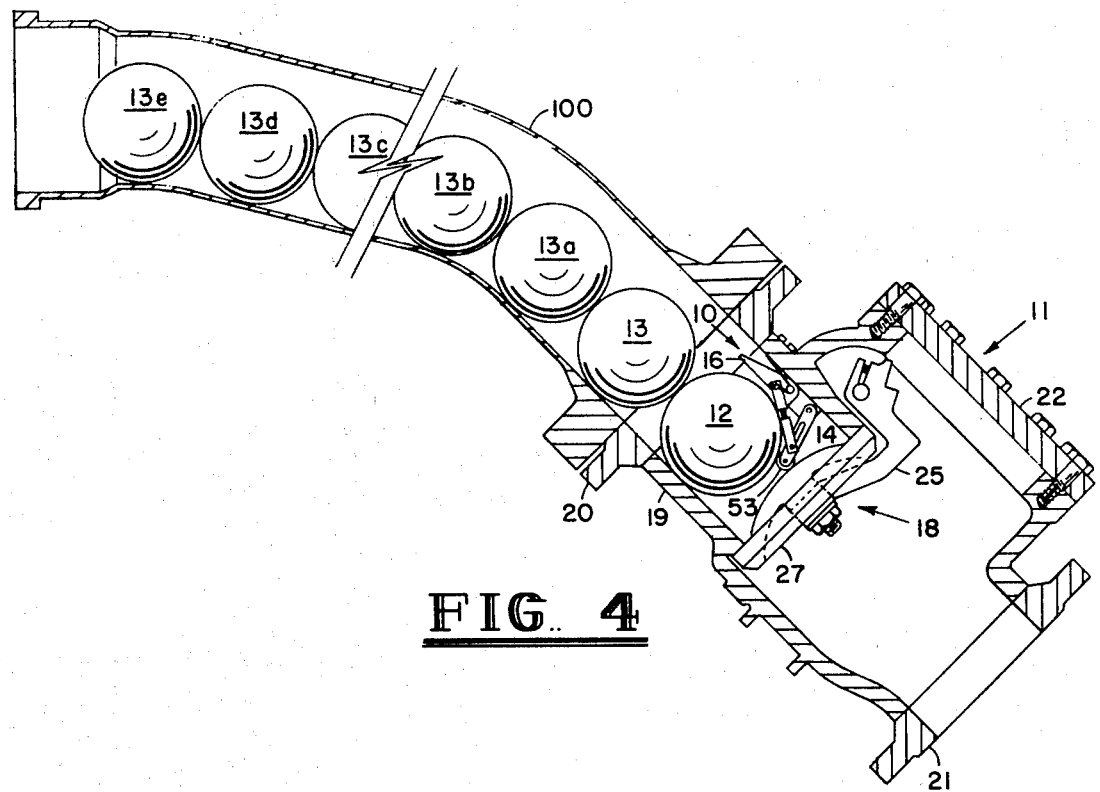
FIG. 4 is a side elevation view of the sphere launching apparatus, partly in cross section and a sphere storage barrel filled with spheres.
Figure 5:
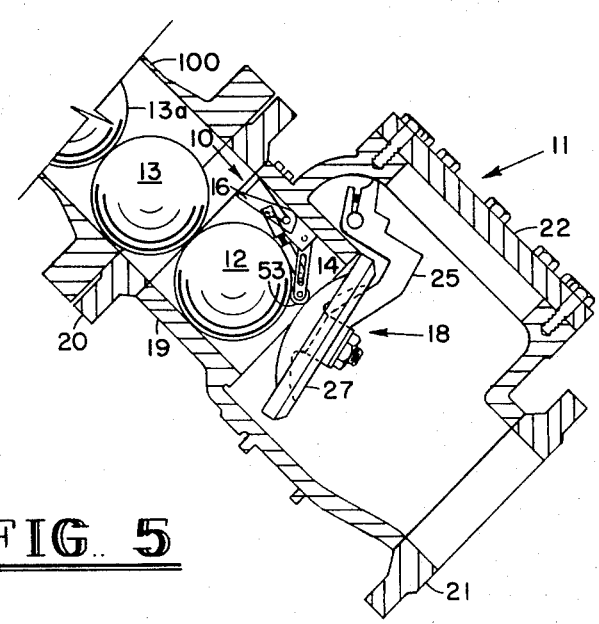
FIG. 5 is a side elevation view of the sphere launching apparatus, partly in cross section, showing the releasing means as the check valve is partially opened.

Referring to FIGS. 1 and 4 of the drawings, there is shown sphere launching apparatus 10 attached to valve 11. A plurality of spheres 12, 13, 13a, 13b, 13c, 13d and 13e are shown for ejection into a pipeline (not shown). The sphere launching apparatus 10 includes a releasing means 14 which is pivotally mounted with support member 15. A catcher means 16 is also pivotally mounted with support member 15. A catcher means 16 is also pivotally mounted to support means 15 for sequentially releasing spheres into the pipeline. The catcher means 16 and releasing 14 are operatively connected by actuating means 17 as will be more fully explained hereinafter. The valve 11 includes a valve closure member 18 for controlling the release of spheres into the pipeline. A storage barrel 100 is provided for storing the spheres.

The valve 11 is of conventional construction and takes the form of a swing clapper valve. The valve 11 includes a body portion 19 including an inlet flange 20 an outlet flange 21 for connecting the valve 11 in the launching system. The inlet flange 20 may typically be connected to a launcher tube 100 shown in FIG. 4 which will contain the plurality of spheres for ejecting into the pipeline. The apparatus may be connected in a launching system such as shown in U.S. Pat. No. 3,169,263, H. N. Eagleton inventor, which patent is incorporated herein for all purposes by this specific reference thereto. The valve 11 additionally includes a removable cover plate 22 which is secured to an opening 23 by a plurality of removeable studs 24 for providing access to the valve closure member 18.

Figure 2:
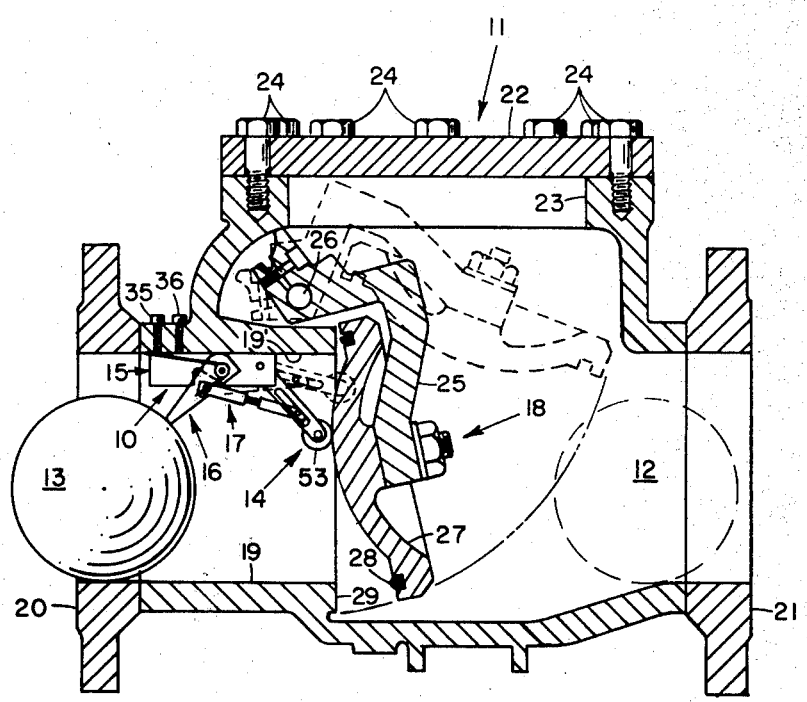
FIG. 2 is another side elevation view of the sphere launching apparatus, partly in cross-section, showing the position of the valve closure member after a sphere has been released into the pipeline and just prior to closure of the valve closure member to position a new sphere for release into the pipeline.

The valve closure member 18 includes a clapper arm 25 which is pivotally mounted about support pin 26 for swinging movement as shown in FIG. 2. Removably mounted upon the clapper arm 25 is a conventional clapper 27 which includes annular seal means 28 for engaging the annular sealing surface 29 on the valve body portion 19. Since the valve 11 is of conventional construction, no further description is provided thereof.

Figure 3:
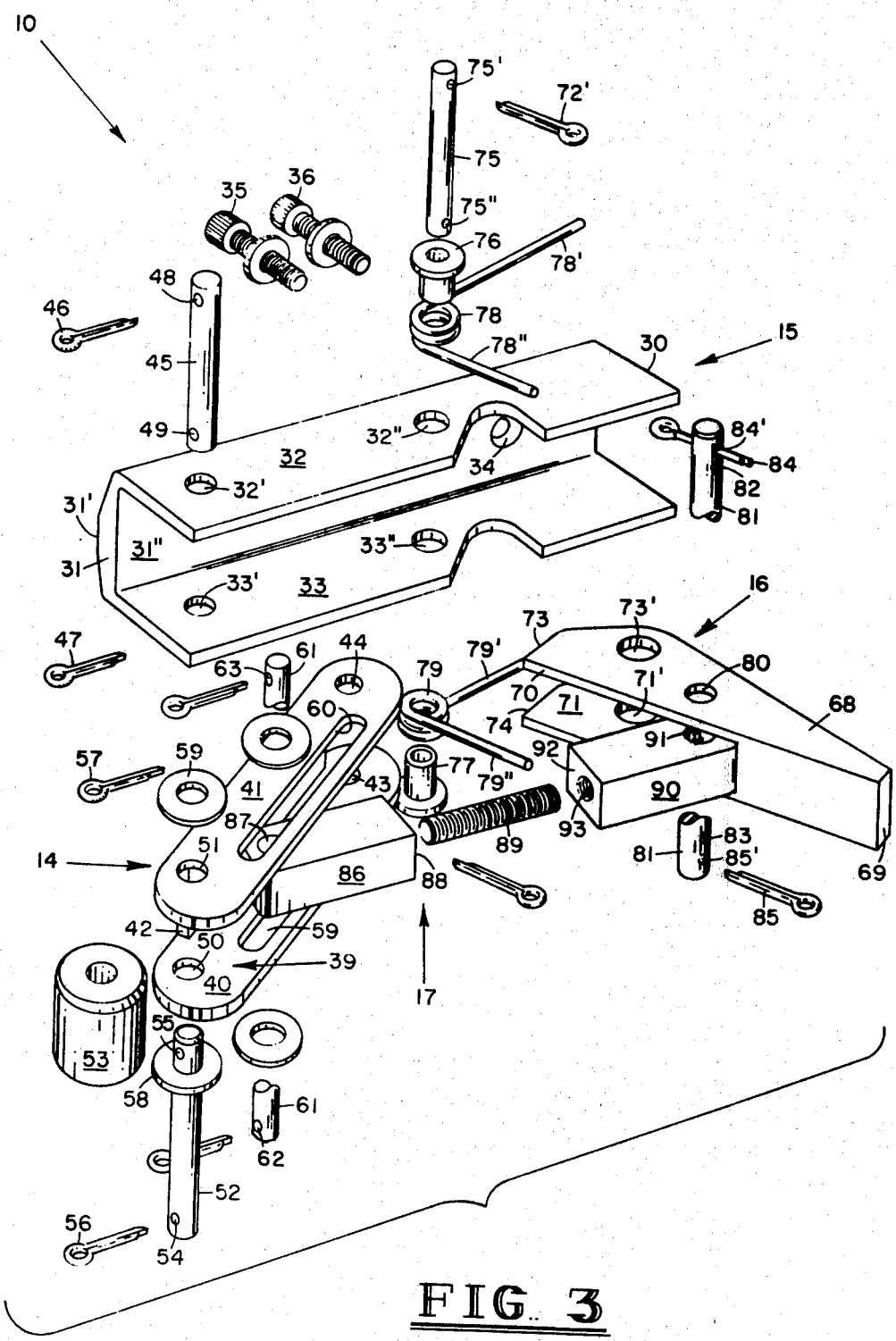
FIG. 3 is an exploded view of the sphere launching apparatus which may be mounted into a conventional valve.

The sphere launching apparatus as shown in detail is FIG. 3 is designed for removably mounting in conventional valve 11. However, it is also understood that it is contemplated that the support member 15 might be integrally formed with the valve body 11 if desired. The support member 15 includes a support bracket 30 comprising a bifurcated member having a central portion 31 for receiving the securing bolts 35 and 36 which extends through openings 37 and 38 in the body portion 19 as shown in FIGS. 1 and 2. The back surface 31' of the central portion 31 rests against the wall surface 19' of the body portion 19.

The releasing means 14 includes a bifurcated member 39 which is formed from two side plates 40 and 41 which are joined by back member 42. A plurality of apertures 43 and 44 are provided in the side plates 40 and 41 respectively for receiving a pivot pin 45 which extends through openings '32 and '33 in the side portions 32 and 33 respectively. Conventional cotter keys 46 and 47 are inserted through apertures 48 and 49 in the pin 45 for retaining the pin in position to pivotally mount the bifurcated member to the support bracket 30. At the other end of the bifurcated member 39, there is provided apertures 50 and 51 for receiving pin 52 upon which is mounted a roller 53 which roller is mounted between the side plates 40 and 41. The pin 52 includes apertures 54 and 55 through which extend cotter keys 56 and 57 respectively which along with the washers 58 and 59 retain the pin 52 in position so as to rotatably mount the roller 53 with the bifurcated member 39. A plurality of elongated slots 59 and 60 are provided in the side plates 40 and 41 respectively for slidably receiving the pin member 61 which includes apertures 62 and 63 in the ends thereof for receiving cotter keys 64 and 65 respectively which along with the washers 66 and 67 hold the pin 61 in position for sliding movement within the slots 59 and 60.

A catcher means 16 includes an elongated catcher member 68 having an end portion 69 which engages spheres as best shown in FIG. 2. A recess formed by the side walls 70 and 71 is provided for receiving the actuating means 17. End portions 73 and 74 are provided to engage the inside surface 31" of the support bracket 30 so as to limit the rotation of the catcher member 68 in a counterclockwise direction as best shown in FIG. 2. The catcher member 68 is mounted for rotation about pivot pin 75 which extends through bearing means 76 and 77 which extend through apertures 32' and 32" respectively in side portions 32 and 33 respectively. Cotter keys 72 and 72' extend through openings 75' and 75" in the pin 75 to retain the pin in position. Spring members 78 and 79 are mounted with the bearing means 76 and 77 on the outside of the side portions 32 and 33 so that the ends of the end portions 78' and 79' will engage the innerbody surface 19' as best shown in FIGS. 1 and 2. The bearing means 76 and 77 also extend through openings 73' and 71' respectively to mount the catcher member 68 with support bracket 30 for pivotal movement with respect thereto.

Apertures 80 (one of which is shown) are also provided in the sidewall 70 and 71' for receiving pivot pin 81. Pivot pin 81 includes apertures 82 and 83 for receiving the ends 78" and 79" of the springs 78 and 79, respectively. Cotter keys 84 and 85 extend through openings 84' and 85' in the pin 81 for further retaining the pin in position.

The actuating means 17 includes a first link member 86 having an aperture 87 extending therethrough for receiving the pivot pin 61. The link member 86 includes a threaded opening in the end portion 88 for receiving the threaded member 89. A second link member 90 is provided which has aperture 91 extending therethrough for receiving the pivot pin 81. A threaded aperture 93 is provided in the end portion 92 for threadably receiving the threaded member 89. As will be apparent, the distance between the apertures 81 and 91 may be adjusted depending on how much the threaded member 89 is screwed into the threaded apertures in the link members 86 and 90.

METHOD OF OPERATION

Figure 6:
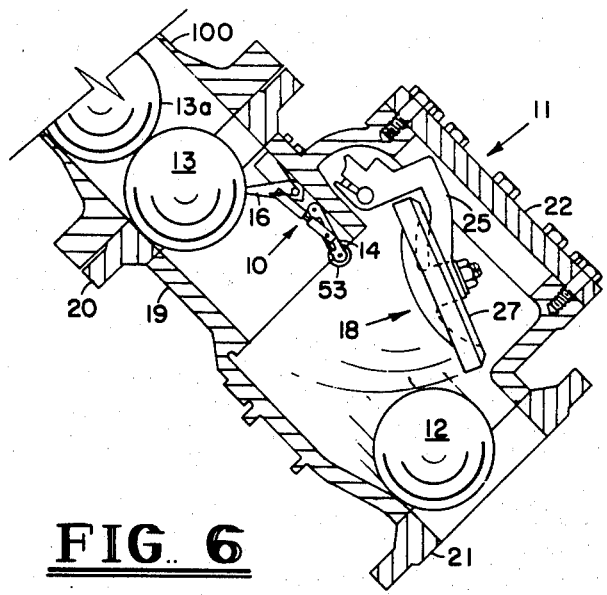
FIG. 6 is a side elevation view of the sphere launching apparatus, partly in cross section, showing the position of the catcher means and releasing means after the sphere is released.
Figure 7:
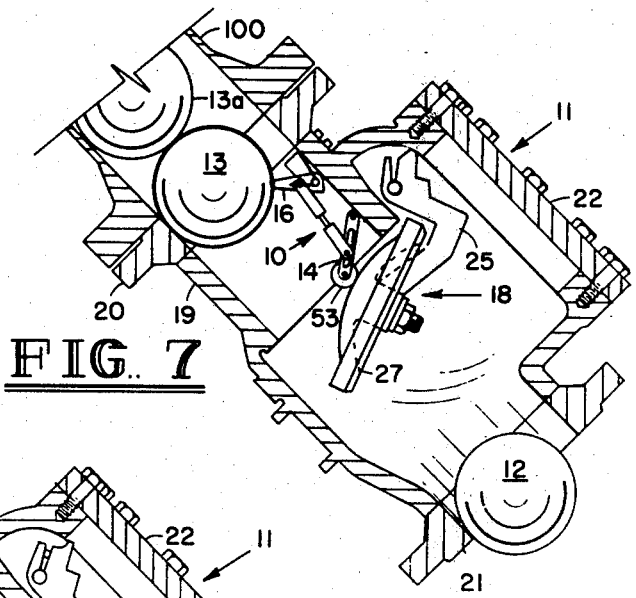
FIG. 7 is a side elevation view of the sphere launching apparatus, partly in cross section, showing the position of the releasing means just prior to closing of the check valve.

The method of operation of the sphere launching apparatus of the invention can best be understood with reference to FIGS. 4 through 8. In FIG. 4, the valve closure member, which includes the clapper 27, is in the closed position. The sphere 12 is in position engaging the roller 53 on the releasing means 14. When it is desired to release the sphere 12 into the pipeline, the support pin 26 is rotated to swing the clapper open (partially open in FIG. 5) to allow the sphere 12 through the force of gravity to angularly pivot the releasing means 14 about the pivot pin 45 out of the way of the sphere 12. At the same time the catcher means 16 will pivot downwardly about the pivot pin 75 to the position shown in FIG. 6 at which time the end portions 73 and 74 will engage the surface 31" to prevent further angular movement of the catcher means. At this time the pin 61 will slide in the slots 59 and 60 so as to allow the sphere to move the releasing means out of the way so that the sphere can be released in the pipeline. In FIG. 6 the sphere 12 is shown after it has been released into the pipeline through swinging of the valve closure member to its open position. In FIG. 7 the valve closure member is shown moved almost to the closed position whereby the pin 61 has again engaged the end of the slots 59 and 60.

Figure 8:
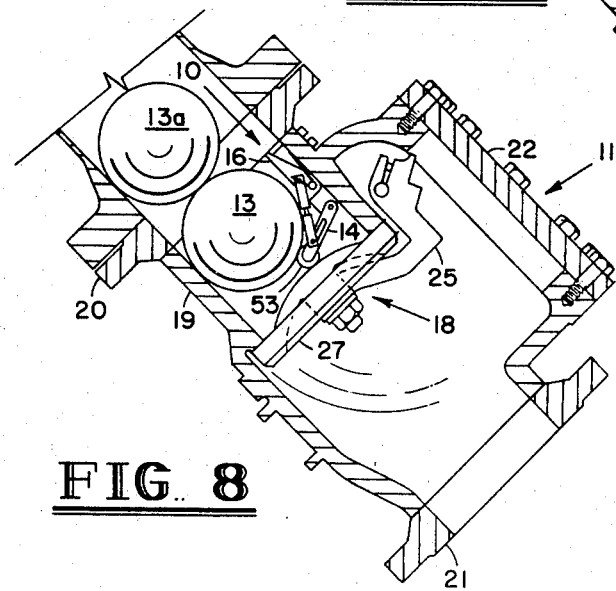
FIG. 8 is a side elevation view of the sphere launching apparatus, partly in cross section, showing the next sphere in position for launching.

Further movement of the valve closure member to its closed position will cause the releasing means to pivot upwardly through the actuating link 17 so as to release another sphere, namely sphere 13 whereby it will assume the position of sphere 12 in FIG. 8. As best shown in FIGS. 2 and 7, it is apparent that the valve closure member has almost reached the closed position before the pivot pin 61 engages the ends of the slots 59 and 60. At this time the small angular movement of the releasing means provided by fully closing the clapper will cause a greater angular movement of the catcher means whereby the catcher means will be moved to its position as shown in FIG. 1. This is achieved by the relative distances between the pivot pins 75 and 81 relative to the distance between the pivot pins 45 and 61 when the pivot pin 61 engages the ends of the slots 59 and 60. Accordingly, the valve closure member may move to the closed or substantially closed position as shown in FIG. 1 before the sphere 13 has had time to roll into the position of the sphere 12 as shown in FIG. 8. When the sphere 13 engages the roller 53 on the releasing means 14, the valve closure member will generally have already reached its fully closed position. As set forth above, this is provided by the positioning of the actuating means 17 so that the valve closure member 18 does not actuate the catcher means 16 until the valve closure member is almost closed and by the relative angular movement between the releasing means 14 and catcher 16 means. The spring members 78 and 79 assure that the catcher means 16 will be moved from its position as shown in FIGS. 1 and 4 to the position as shown in FIGS. 2 and 6 to prevent the release of more than one sphere for each opening of the valve closure member 18.

Since the valve closure member 18 generally reaches its fully closed position before the next sphere engages the roller 53 on the releasing means 14, the amount of closing force to be applied to the valve closure member is less than would be required to force one or more spheres back up into the launching tube if they had already engaged the releasing means long before the valve closure member had reached its fully closed position. This is of particular significance when a plurality of very large spheres, which may be 24" or 36" spheres, are positioned in the launching tube.

The actuating means 17 can be adjusted to provide the proper angular relationship between the releasing means 14 and catcher means 15. This adjustment greatly facilitates manufacturing since the permissible tolerances are greater due to the adjustment which is provided. The adjustment can be achieved by removing one or both of the pins 61 and 81 so that one of the link members 86 and 90 may be rotated relative to the other to move them further apart or closer together due to the threaded member 89. Accordingly, the angular relationship between the catcher means and releasing means can be quite simply adjusted so as to properly release a single sphere for each opening and closing of the valve closure member 18. The adjustment of the actuating means 17 allows for setting of the relative angular position of the releasing means and catcher means so that they may be optimally set for the particular size sphere which is being utilized. Since casting may be used in manufacturing the need for machining to achieve close tolerances is reduced or eliminated by the adjusting feature.

While there has been shown and described a preferred embodiment of the sphere launching apparatus in accordance with the invention, it will be appreciated that many changes and modifications may be made therein without, however, departing from the essential spirit of the invention within the scope of the claims.

I claim:

1. A method for sequentially releasing spheres into a pipeline from a multiple sphere storage barrel in response to opening and closing of a valve closure member communicating the storage barrel with the pipeline and engagement and disengagement of a sphere engaging means, comprising the steps of:

releasing a sphere from the releasing position in response to angular movement of an actuating means engaging the valve closure member and opening of the closure member;

engaging the next sphere with the sphere engaging means in the multiple sphere storage barrel in response to the movement and opening to prevent releasing of more than one sphere;

substantially closing the valve closure member before disengaging said next sphere in response to said closing;

disengaging the sphere engaging means from the next sphere by moving the sphere engaging means at a faster angular rate than the angular rate of the actuating means so that the sphere engaging means can be disengaged to release the next sphere after the valve member is substantially closed to position the next sphere for release upon opening of the closure member.

* * * * *